(12) United States Patent
Yidong (10) Patent No.: US 10,253,922 B1
(45) Date of Patent: Apr. 9, 2019

(54) BOOM ARM CLAMP

(71) Applicant: Ye Yidong, Yuyao (CN)

(72) Inventor: Ye Yidong, Yuyao (CN)

( * ) Notice: Subject to any disclaimer, the term of this patent is extended or adjusted under 35 U.S.C. 154(b) by 0 days.

(21) Appl. No.: 15/892,231

(22) Filed: Feb. 8, 2018

(51) Int. Cl.
| | |
|---|---|
| *F16M 11/00* | (2006.01) |
| *F16M 11/16* | (2006.01) |
| *F16B 2/00* | (2006.01) |
| *F16B 2/12* | (2006.01) |

(52) U.S. Cl.
CPC ........... *F16M 11/16* (2013.01); *F16B 2/005* (2013.01); *F16B 2/12* (2013.01); *F16M 2200/022* (2013.01)

(58) Field of Classification Search
None
See application file for complete search history.

(56) References Cited

U.S. PATENT DOCUMENTS

| | | | | |
|---|---|---|---|---|
| 2,366,950 A | * | 1/1945 | Wright ................. | F16M 11/048 248/122.1 |
| 2,532,173 A | * | 11/1950 | Lewis ..................... | H04R 1/08 248/413 |
| 2,548,650 A | * | 4/1951 | Brandt ................... | G03B 15/07 248/413 |
| 4,773,621 A | * | 9/1988 | Gebhardt ............... | F16M 11/10 248/122.1 |
| 6,007,032 A | * | 12/1999 | Kuo ....................... | F16M 11/10 248/125.1 |
| 6,814,332 B2 | | 11/2004 | Eason | |
| 7,207,532 B1 | * | 4/2007 | Roberts .................. | F16C 11/10 248/125.1 |
| 9,310,021 B2 | * | 4/2016 | Hennessey ............. | F16M 11/10 |
| 9,719,627 B2 | | 8/2017 | Hennessey | |

* cited by examiner

*Primary Examiner* — Amy J. Sterling
(74) *Attorney, Agent, or Firm* — Kelly & Kelley, LLP (57) ABSTRACT

A boom arm clamp apparatus for reliably securing a boom arm. Distinguished from prior art devices, the apparatus includes first clamping plate that has a set of tapered channels configured to engage a set of tapered ridges on a second clamping plate. When the set of tapered channels engages the set of tapered ridges under a compressive force, the sidewalls bond as in a Morse taper. The bonding of the sidewalls on the tapered channels and ridges provide a more secure bonding surface to hold the boom arm. The channels and ridges are preferably annular to match the preferred shape of the clamping plates.

20 Claims, 7 Drawing Sheets

BOOM ARM CLAMP

BACKGROUND OF THE INVENTION

The present invention is directed to a boom arm support clamp, specifically novel clamp design for securely holding a boom arm, as a microphone or similar structure to be positioned and resist cantilever forces.

Boom arms that support lights, microphones or similar devices often experience significant forces, especially when supporting devices at the end of relatively long boom arms. Such forces can cause clamps and other holding mechanisms to slip or fail under the load.

Figure 1:
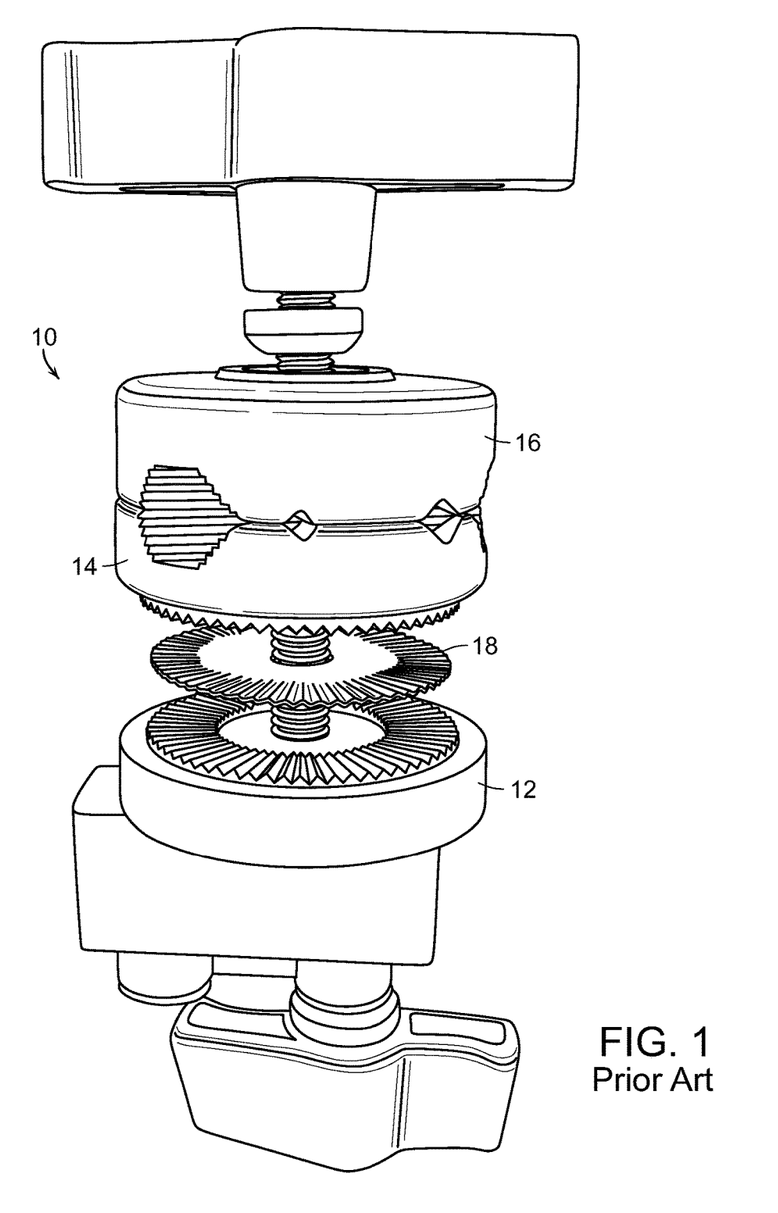
FIG. 1 is a perspective view of a prior art boom arm clamp having meshed, gear-like teeth.
Figure 2:
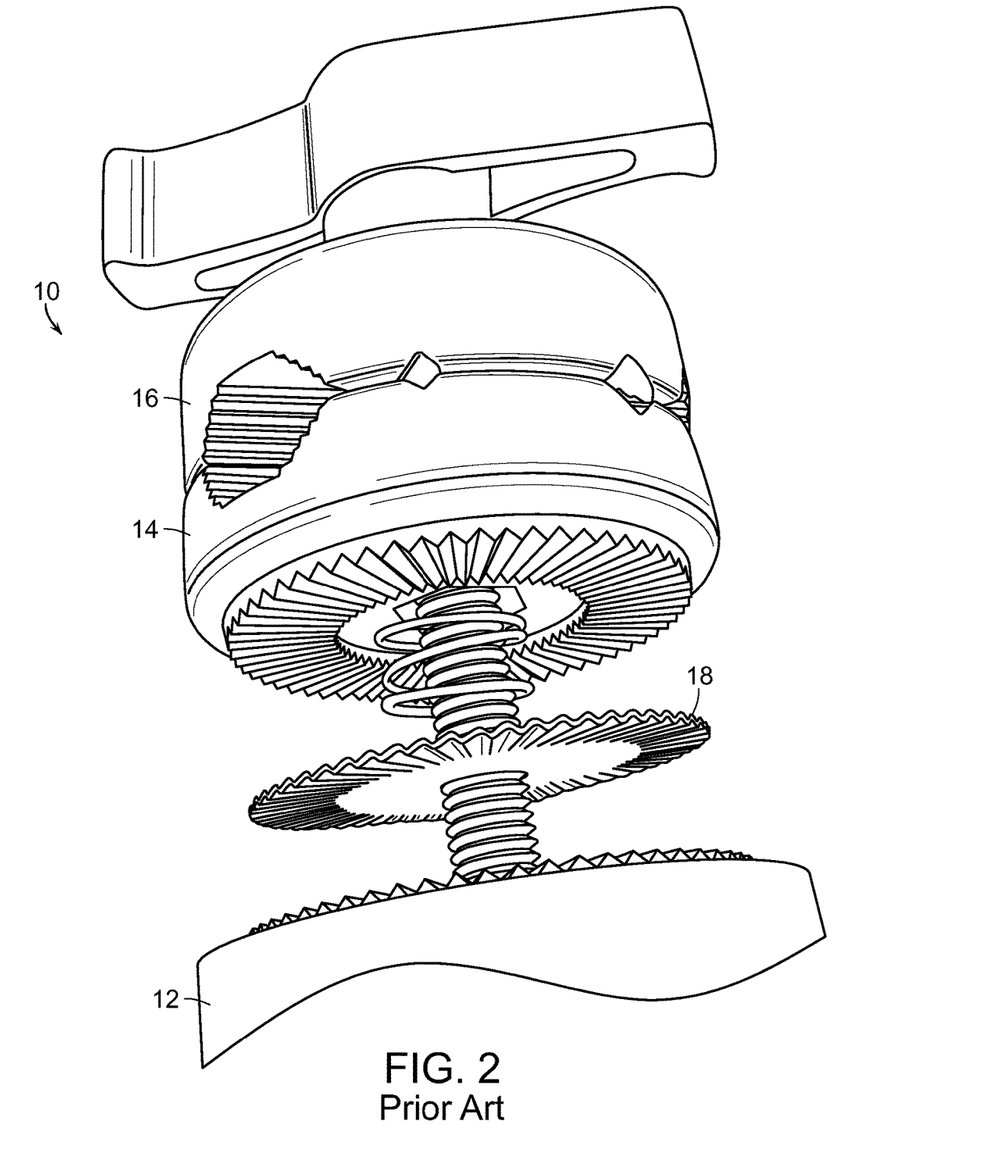
FIG. 2 is another perspective view of the prior art boom arm clamp having meshed gear-like teeth.

Prior art clamp devices either rely on friction clamps or meshed gear-like teeth. The problem with friction clamps is that the same can fail—either under sufficient weight or over time as the friction surfaces slowly slide relative to each other. The problem with meshed gear-like teeth, as shown in FIGS. 1 and 2, is that the gear-like teeth restrict the boom arm clamp to precise positions for placement around a rotational axis. If the gear-like teeth do not fully engage when securing the clamp, the teeth may slip and result in unintended loosening of the clamp. The spatial difference in the positioning of such teeth can be made very fine, but at the time and expense of manufacturing gear-like teeth with very fine spacing.

Accordingly, there is a need for a boom arm clamp that provides a reliably secure clamping mechanism without restrictions on rotational positioning around an axis. The present invention fulfills those needs and provides other related advantages.

SUMMARY OF THE INVENTION

The present invention is directed to a boom arm clamp apparatus. The apparatus includes a first clamping plate disposed adjacent to a second clamping plate, which is in turn disposed adjacent to a third clamping plate. The second clamping plate and third clamping plate are configured for mating engagement so as to define a boom arm receiving port. A set of channels is included on a first mating surface of the first clamping plate. Sidewalls of the set of channels are slightly tapered so that the channels are wider at a point distal from the first mating surface. A set of ridges is included on a second mating surface of the second clamping plate. Sidewalls of the set of ridges are slightly tapered so that the ridges are narrower at a point distal from the second mating surface. The set of ridges and the set of channels are configured for mating engagement such that the tapered ridges engage the tapered channels to removably bond the first clamping plate to the second clamping plate. In a particularly preferred embodiment, the set of channels and set of ridges are preferably annular in shape, matching a preferred shape of the first and second clamping plates.

The apparatus further includes a threaded bolt fixedly engaged with the first clamping plate and passing through the second clamping plate and the third clamping plate. The other end of the threaded bolt is engaged with a threaded knob, which is configured to compress the third clamping plate against the second clamping plate and the second clamping plate against the first clamping plate. The second clamping plate may include a locking pin that a configured for sliding engagement with a pin port on the third clamping plate. The sliding engagement of the locking pin with the pin port locks the second clamping plate in a fixed rotation relative to the third clamping plate.

The boom arm receiving port preferably includes a set of ridged teeth configured to secure a boom arm received therein against axial rotation. The second clamping plate and the third locking plate define a plurality of boom arm receiving ports, in particular four boom arm receiving ports. In a particularly preferred embodiment, a first set of two boom arm receiving ports are oriented parallel to each other, and a second set of two boom arm receiving ports are oriented parallel to each other and perpendicular to the first set of two boom arm receiving ports.

A base boom securing port is preferably attached to the first clamping plate on an exterior surface generally opposite the first mating surface. The base boom securing port is configured to attach the boom arm support to a stable base.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

In the following detailed description, the boom arm support apparatus of the present invention is generally referred to by reference numeral 110 in FIGS. 3-7. The individual components and the structural relationship of the components of the boom arm support apparatus 110 are most clearly shown in FIG. 3.

Initially, FIGS. 1 and 2 illustrate a prior art version of a boom arm support clamp 10. This prior art boom arm support 10 includes a first clamping plate 12, a second clamping plate 14, and a third clamping plate 16. The prior art clamp device 10 uses a serrated plate 18 between serrated surface 12a of the first clamping plate 12 and serrated surface 14a of the second clamping plate 14. The serrated plate 18 engages with the serrated surfaces 12a, 14a to provide a more secure connection for the first clamping plate 12 and the second clamping plate 14.

Figure 3:
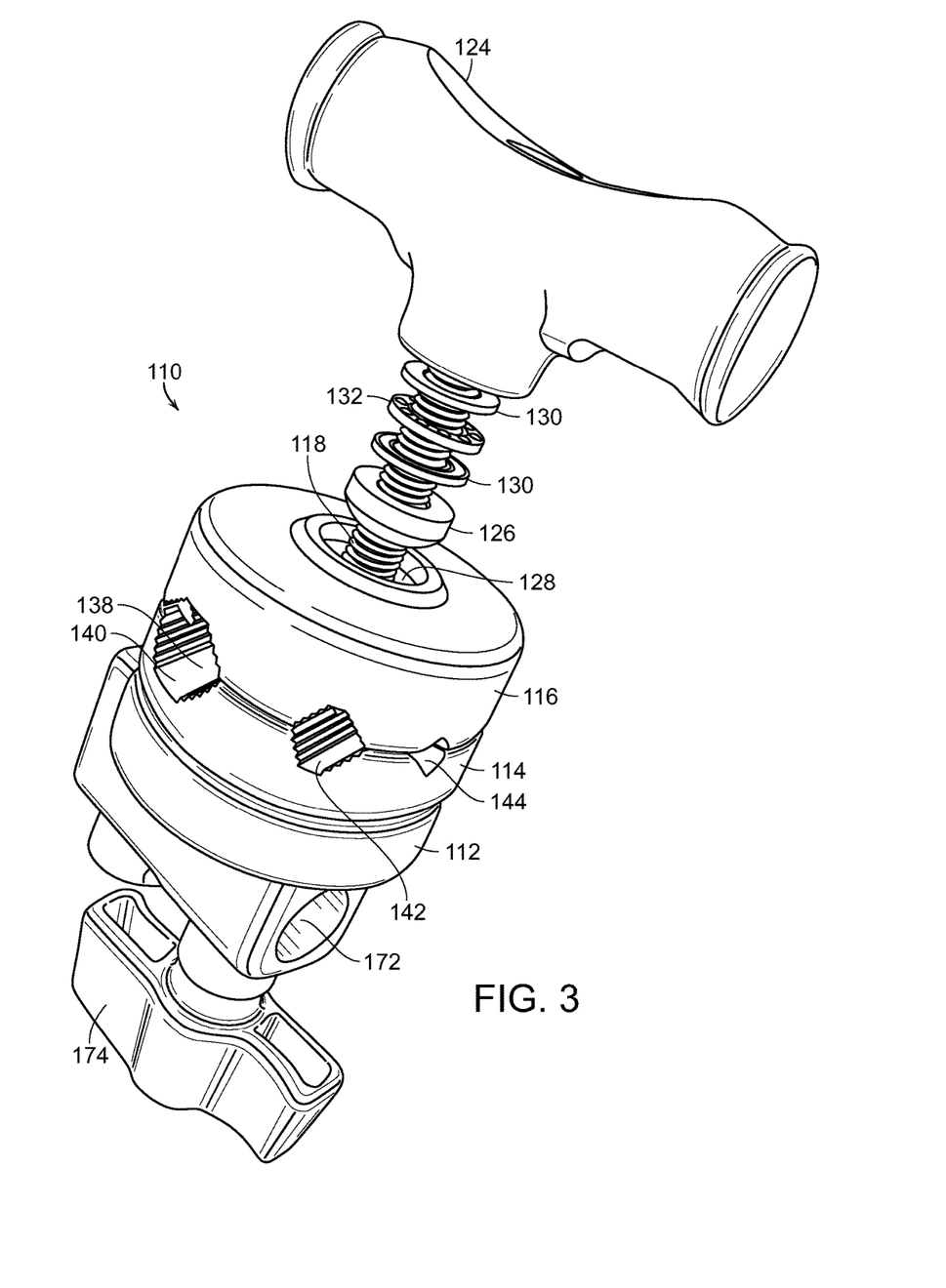
FIG. 3 is a perspective view of a preferred embodiment of the boom arm support apparatus of the present invention.
Figure 4:
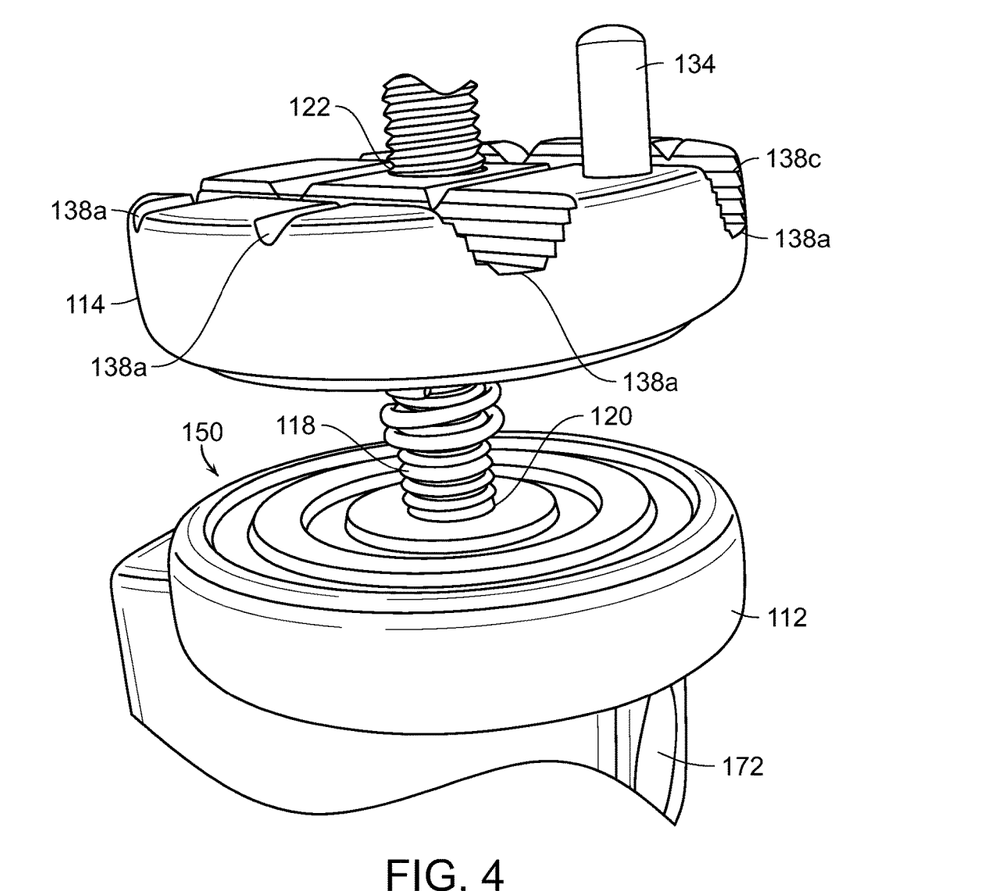
FIG. 4 is a close-up view perspective of the first and second clamping plates of a preferred embodiment of the boom arm support apparatus of the present invention.
Figure 5:
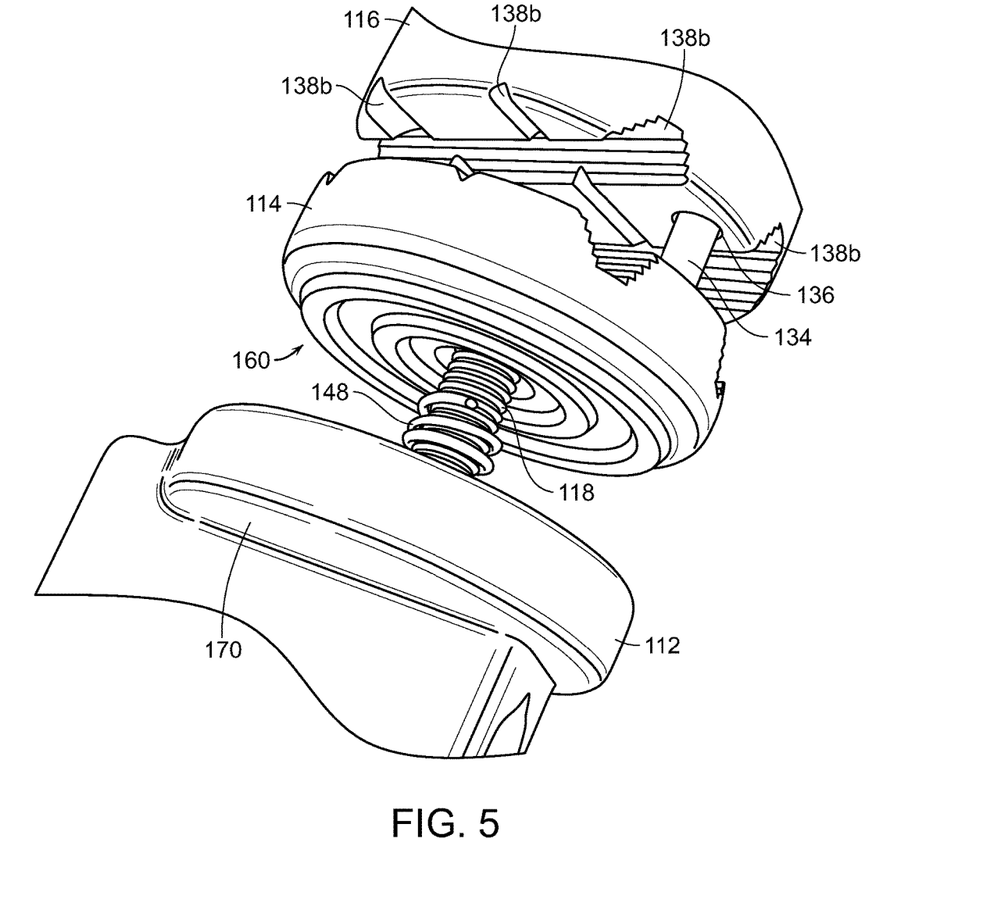
FIG. 5 is a close-up perspective view of the first, second and third clamping plates of a preferred embodiment of the boom arm support apparatus of the present invention.
Figure 6:
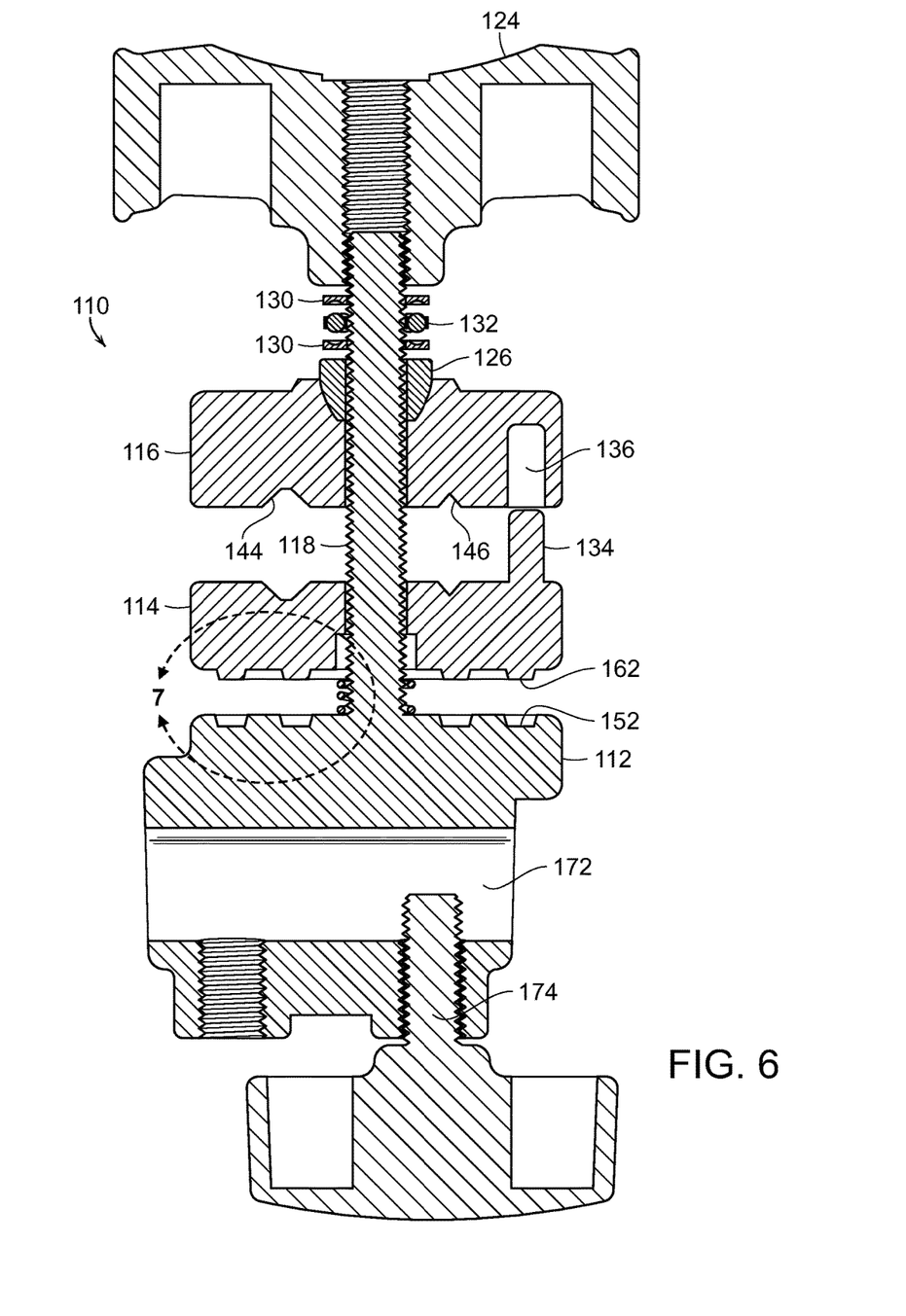
FIG. 6 is a cross-sectional view of a preferred embodiment of the boom arm support apparatus of the present invention.

FIG. 3 illustrates perspective view of the inventive apparatus 110, including the first clamping plate 112, second clamping plate 114, and third clamping plate 116. The first, second, and third clamping plates 112, 114, and 116 are depicted abutting against each other. A threaded bolt 118 is secured to the first clamping plate 112 and passes through each of the second and third clamping plates 114, 116. As shown in FIG. 6, the threaded bolt 118 is attached to the first clamping plate 112 as being formed integrally therewith. Alternatively, as showing in FIG. 4, the threaded bolt 118 may be threaded into a mating bolt hole 120 on the first clamping plate 112. The second and third clamping plates 114, 116 can freely slide along the threaded bolt 120 through corresponding bolt openings 122.

Each of the first, second and third clamping plates 112, 114, 116 are preferably circular in design but may be configured in alternate shapes. The threaded bolt 118 preferably engages each of the first, second and third clamping plates 112, 114, 116 through a center point, such each plate 112, 114, 116 concentrically disposed about the threaded bolt 118.

A threaded knob 124 engages an end of the threaded bolt 118 most distant from the first clamping plate 112. The threaded knob 124 is configured the receive as much length of the threaded bolt 118 as is necessary to press the third clamping plate 116 against the second clamping plate 114, which is in turn pressed against the first clamping plate 112. A wedge washer 126 may be slidingly disposed on the threaded bolt 118 between the threaded knob 124 and the third clamping plate 116. The wedge washer 126 is preferably configured to engage a recess 128 in an exterior surface of the third clamping plate 116 so as to provide a flat surface for the threaded knob 124 to press against.

As shown in FIG. 3, a combination of flat washers 130 and/or bearing washers 132 may also be slidingly disposed on the threaded bolt 118 between the threaded knob 124 and the wedge washer 126. Such flat washers 130 and/or bearing washers 132 may facilitate tightening of the threaded knob 124 by allowing for more rotational movement of the threaded knob 124 when under high forces.

The second and third clamping plates 114, 116 are configured to engage in a rotationally locked position by engagement of mating components such as a locking pin 134 and locking port 136. The locking pin 134 may be attached in an interior surface 114a of either the second clamping plate 114 or the third clamping plate 116. Accordingly, the locking port 136 is then disposed on a facing interior surface 116a of the third clamping plate 116 or second clamping plate 114. When the interior surfaces 114a, 116a of the second and third clamping plates 114, 116 are brought into contact, the locking pin 134 fits into the locking port 136 such that the second and third clamping plates 114, 116 are not independently rotatable relative to one another. When locked together, the second and third clamping plates 114, 116 may only rotate about the threaded bolt 118 in a unitary manner.

When the second and third clamping plates 114, 116 are locked together as described, they preferably define a plurality of boom arm receiving ports 138. The boom arm receiving ports 138 preferably consist of a passage straight through the engaged interior surfaces 114a, 116a from one edge of the second and third clamping plates 114, 116 to an opposite edge, offset from the center of the plates 114, 116 so as not to intersect the threaded bolt 118.

Each boom arm receiving port 138 is split into matching grooves 138a, 138b on the second and third clamping plates 114, 116, respectively. The grooves 138a, 138b are preferably equally sized with their matching groove, but may also be unequally sized. Each of the grooves 138a, 138b together form the receiving port 138 that has a preferably polygonal cross-section that provides multiple points of contact with a boom arm (not shown), with such contact designed to restrict longitudinal and rotational movement of the boom arm relative to the second and third clamping plates 114, 116.

Each of the grooves 138a, 138b may also include a plurality of ridges or teeth 138c on one or more of the surfaces of the grooves 138a, 138b. The ridges or teeth 138c are designed to increase the number of points of contact with a boom arm (not shown), so as to further restrict rotational movement of the boom arm relative to the second and third clamping plates 114, 116.

The boom arm receiving ports 138 may be provided in various sizes, preferably at least four sizes. Two of the differently sized receiving ports 140, 142 are preferably oriented parallel to each other on either side of the threaded bolt 118. The other two of the differently sized receiving ports 144, 146 are preferably oriented parallel to each other on either side of the threaded bolt 118, and perpendicular to the first two of the differently sized receiving ports 140, 142.

Figure 7:
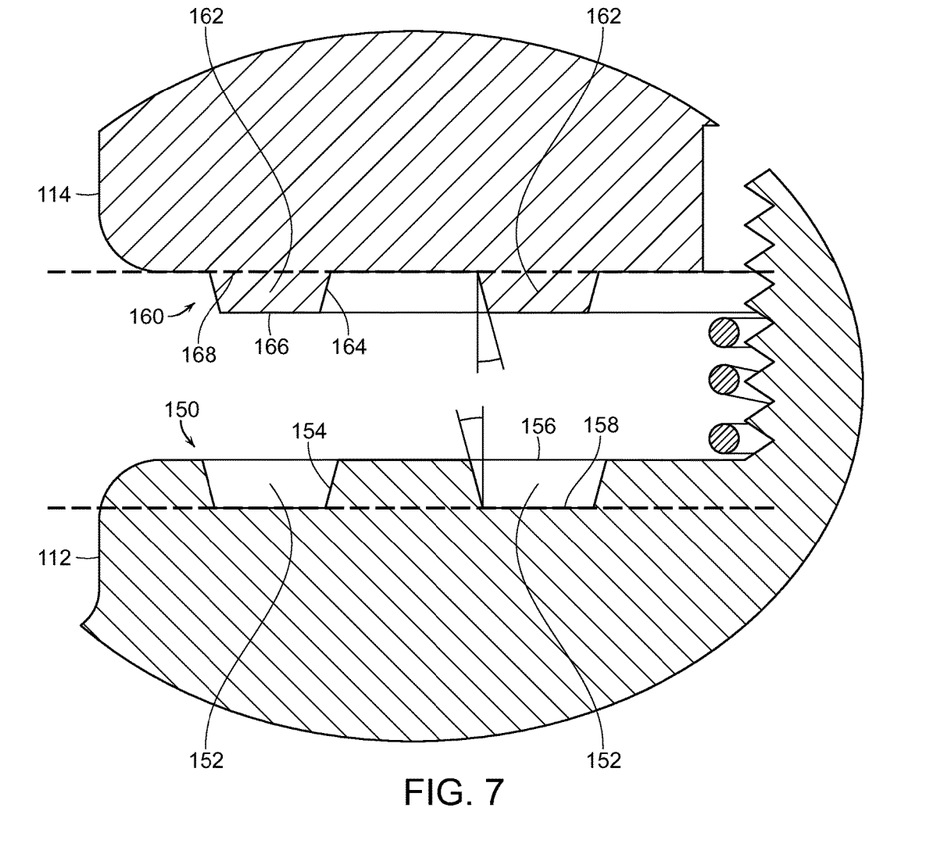
FIG. 7 is a close-up, cross-sectional view of a portion of the locking surfaces of the first and second clamping plates showing the channels and ridges.

FIG. 7 shows a close-up, cross-sectional view of the first clamping plate 112 and the second clamping plate 114. The first clamping plate 112 has a first mating or locking surface 150 with a set of channels 152, preferably annular in shape matching the first clamping plate 112. Sidewalls 154 of the channels 152 preferably have a tapered configuration relative to the first clamping plate 112 or first mating surface 150. The tapered configuration creates channels 152 that are wider at a distal point 156 farthest away from the first clamping plate 112 or first mating surface 150 and narrower at a proximate point 158 immediately adjacent to the first clamping plate 112 or first mating surface 150. This is most clearly shown in the cross-sectional view of FIG. 6.

Similarly, the second clamping plate 114 has a second mating or locking surface 160 with a set of ridges 162, preferably annular in shape matching the second clamping plate 114. Sidewalls 164 of the ridges 162 preferably have a tapered configuration relative to the second clamping plate 114 or second mating surface 160. The tapered configuration creates ridges 162 that are narrower at a distal point 166 farthest away from the second clamping plate 114 or second mating surface 160 and wider at a proximate point 168 immediately adjacent to the second clamping plate 114 or second mating surface 160. This is most clearly shown in the cross-sectional view of FIG. 6.

When the tapering set of channels 152 engages the tapering set of ridges 162 under the force of the threaded knob 124, the sidewalls 154, 164 engage each other under the principle of a Morse taper. The channels 152 and ridges 162 form a concavo-convex circular or annular engagement to provide a large locking force with effectively zero empty space between the first and second clamping plates 112, 114. The Morse taper configuration of the sidewalls 154, 164 creates an effective metal-to-metal bond that will not slip so long a force is exerted by the compression of the threaded knob 124 against the wedge washer 126 and the first, second, and third clamping plates 112, 114, 116.

The inventive device 110 preferably includes a spring 148 disposed concentrically around the threaded bolt 118 between the first clamping plate 112 and the second clamping plate 114. The spring 148 is designed to maintain at least a minimum distance between the first clamping plate 112 and the second clamping plate 114 when not under a clamping force from the threaded knob 124. Without the spring 148, the first clamping plate 112 and second clamping plate 114 would be more likely to come together such that the locking surfaces 150, 160 might engage and present difficulty in setting the boom arm clamp device 110 in a proper manner. The spring 148 maintains at least the minimum distance so that the second clamping plate 114 can be freely rotated when setting the boom arm clamp device 110.

An exterior surface 170 of the first clamping plate 112 is preferably provided with a securing port 172 for securing the boom arm clamp device 110 to a fixed base boom (not shown). The securing port 172 is preferably shaped as a cylinder for receiving a fixed base boom and comprises a threaded lock pin 174 configured to lock the fixed boom within the securing port 172. When secured to a fixed base boom by the securing port 172, the boom arm clamp device 110 provides a reliable apparatus for quickly and easily securing a boom arm as needed.

Although several embodiments have been described in detail for purposes of illustration, various modifications may be made without departing from the scope and spirit of the invention. Accordingly, the invention is not to be limited, except as by the appended claims.

What is claimed is:

1. A boom arm clamp apparatus, comprising:
   a first clamping plate disposed adjacent to a second clamping plate, which is in turn disposed adjacent to a third clamping plate, wherein the second clamping plate and third clamping plate are configured for mating engagement so as to define a boom arm receiving port;
   a set of channels on a first mating surface of the first clamping plate, wherein sidewalls of the set of channels are slightly tapered so that the channels are wider at a point distal from the first mating surface;
   a set of ridges on a second mating surface of the second clamping plate, wherein sidewalls of the set of ridges are slightly tapered so that the ridges are narrower at a point distal from the second mating surface; and
   wherein the set of ridges and the set of channels are configured for mating engagement such that the tapered ridges engage the tapered channels to removably bond the first clamping plate to the second clamping plate.

2. The boom arm clamp apparatus of claim 1, further comprising a threaded bolt fixedly engaged with the first clamping plate, passing through the second clamping plate and the third clamping plate and engaged with a threaded knob, wherein the threaded knob is configured to compress the third clamping plate against the second clamping plate and the second clamping plate against the first clamping plate.

3. The boom arm clamp apparatus of claim 1, wherein the second clamping plate comprises a locking pin and the third clamping plate comprises a pin port, wherein the locking pin and the pin port are configured for sliding engagement.

4. The boom arm clamp apparatus of claim 3, wherein the sliding engagement of the locking pin with the pin port locks the second clamping plate in a fixed rotation relative to the third clamping plate.

5. The boom arm clamp apparatus of claim 1, wherein the boom arm receiving port comprises a set of ridged teeth configured to secure a boom arm received therein against axial rotation.

6. The boom arm clamp apparatus of claim 1, wherein the second clamping plate and the third clamping plate define a plurality of boom arm receiving ports.

7. The boom arm clamp apparatus of claim 6, comprising four boom arm receiving ports, wherein a first set of two boom arm receiving ports are oriented parallel to each other and a second set of two boom arm receiving ports are oriented parallel to each other and perpendicular to the first set of two boom arm receiving ports.

8. The boom arm clamp apparatus of claim 1, further comprising a base boom securing port attached to the first clamping plate on an exterior surface generally opposite the first mating surface, wherein the base boom securing port is configured to attach the boom arm support to a stable base.

9. The boom arm clamp apparatus of claim 1, wherein the set of channels on the first mating surface comprise a set of annular channels and the set of ridges on the second mating surface comprise a set of annular ridges.

10. A boom arm clamp apparatus, comprising:
    a first clamping plate disposed adjacent to a second clamping plate, which is in turn disposed adjacent to a third clamping plate, wherein the second clamping plate and third clamping plate are configured for mating engagement so as to define a boom arm receiving port;
    a threaded bolt fixedly engaged with the first clamping plate, and passing through the second clamping plate and the third clamping plate, wherein the threaded bolt is engaged with a threaded knob that is configured to compress the third clamping plate against the second clamping plate and the second clamping plate against the first clamping plate;
    a set of channels on a first mating surface of the first clamping plate, wherein sidewalls of the set of channels are slightly tapered so that the channels are wider at a point distal from the first mating surface;
    a set of ridges on a second mating surface of the second clamping plate, wherein sidewalls of the set of ridges are slightly tapered so that the ridges are narrower at a point distal from the second mating surface; and
    wherein the set of ridges and the set of channels are configured for mating engagement when the second clamping plate is compressed against the first clamping plate such that the tapered ridges engage the tapered channels to removably bond the first clamping plate to the second clamping plate.

11. The boom arm clamp apparatus of claim 10, wherein the second clamping plate comprises a locking pin and the third clamping plate comprises a pin port, wherein the locking pin and the pin port are configured for sliding engagement.

12. The boom arm clamp apparatus of claim 11, wherein the sliding engagement of the locking pin with the pin port locks the second clamping plate in a fixed rotation relative to the third clamping plate.

13. The boom arm clamp apparatus of claim 10, wherein the boom arm receiving port comprises a set of ridged teeth configured to secure a boom arm received therein against axial rotation.

14. The boom arm clamp apparatus of claim 10, wherein the second clamping plate and the third clamping plate define a plurality of boom arm receiving ports.

15. The boom arm clamp apparatus of claim 14, comprising four boom arm receiving ports, wherein a first set of two boom arm receiving ports are oriented parallel to each other and a second set of two boom arm receiving ports are oriented parallel to each other and perpendicular to the first set of two boom arm receiving ports.

16. The boom arm clamp apparatus of claim 10, further comprising a base boom securing port attached to the first clamping plate on an exterior surface generally opposite the first mating surface, wherein the base boom securing port is configured to attach the boom arm support to a stable base.

17. The boom arm clamp apparatus of claim 10, wherein the set of channels on the first mating surface comprise a set of annular channels and the set of ridges on the second mating surface comprise a set of annular ridges.

18. A boom arm clamp apparatus, comprising:

a first clamping plate disposed adjacent to a second clamping plate, which is in turn disposed adjacent to a third clamping plate, wherein the second clamping plate and third clamping plate are configured for mating engagement so as to define a boom arm receiving port;

a threaded bolt fixedly engaged with the first clamping plate, and passing through the second clamping plate and the third clamping plate, wherein the threaded bolt is engaged with a threaded knob that is configured to compress the third clamping plate against the second clamping plate and the second clamping plate against the first clamping plate;

a set of annular channels on a first mating surface of the first clamping plate, wherein sidewalls of the set of annular channels are slightly tapered so that the channels are wider at a point distal from the first mating surface;

a set of annular ridges on a second mating surface of the second clamping plate, wherein sidewalls of the set of annular ridges are slightly tapered so that the ridges are narrower at a point distal from the second mating surface; and wherein the set of annular ridges and the set of annular channels are configured for mating engagement such that the tapered ridges engage the tapered channels to removably bond the first clamping plate to the second clamping plate.

19. The boom arm clamp apparatus of claim 18, further comprising a threaded bolt fixedly engaged with the first clamping plate, passing through the second clamping plate and the third clamping plate and engaged with a threaded knob, wherein the threaded knob is configured to compress the third clamping plate against the second clamping plate and the second clamping plate against the first clamping plate.

20. The boom arm clamp apparatus of claim 18, further comprising a base boom securing port attached to the first clamping plate on an exterior surface generally opposite the first mating surface, wherein the base boom securing port is configured to attach the boom arm support to a stable base.

* * * * *